United States Patent [19]

Knauer et al.

[11] Patent Number: 5,063,444

[45] Date of Patent: Nov. 5, 1991

[54] HIGH DEFINITION TELEVISION ARRANGEMENT WITH SIGNAL SELECTIONS ADAPTED TO THE AVAILABLE TRANSMISSION CAPACITY

[75] Inventors: Scott C. Knauer, Mountainside; Arun N. Netravali, Westfield; Eric D. Petajan, Millburn; Robert J. Safranek, New Providence; Peter H. Westerink, Millburn, all of N.J.

[73] Assignee: AT&T Bell Laboratories, Murray Hill, N.J.

[21] Appl. No.: 495,523

[22] Filed: Mar. 19, 1990

[51] Int. Cl.$^5$ .................. H04N 7/13; H04N 7/133; H04N 7/137

[52] U.S. Cl. .................................... 358/133; 358/136

[58] Field of Search ................. 358/12, 141, 133, 136, 358/13

[56] References Cited

U.S. PATENT DOCUMENTS

| | | | |
|---|---|---|---|
| 4,517,596 | 5/1985 | Suzuki | 358/13 |
| 4,551,754 | 11/1985 | Meise et al. | 358/180 |
| 4,633,296 | 12/1986 | Cham et al. | 358/12 |
| 4,694,338 | 9/1987 | Tsinberg | 358/12 |
| 4,695,883 | 9/1987 | Chandler et al. | 358/12 |
| 4,933,762 | 6/1990 | Guichard et al. | 358/133 |
| 4,958,226 | 9/1990 | Haskell et al. | 358/136 |

OTHER PUBLICATIONS

Willian K. Pratt, Spatial Transform Coding of Color Images, IEEE Transactions On Communication Technology, vol. COM-19, No. 6, Dec. 1971 pp. 980-991.

Primary Examiner—John W. Shepperd
Attorney, Agent, or Firm—Henry T. Brendzel

[57] ABSTRACT

A high definition television system that is characterized by low transmission bandwidth is achieved by removing redundancies in the signal, encoding the remaining signals, and transmitting the encoded signal in a manner that is most compatible with the applicable standards. In the encoding, groups of signals to be sent are mapped to codebook vectors and the identities of the codebook vectors are sent together with those signals of the groups of signals that correspond to the codebook vectors. To insure that the total number of signals that are sent does not exceed the available capacity, the signals are sorted by a selected importance parameter and assigned for transmission in descending order of importance until the capacity is exhausted. Signals that are not assigned for transmission are discarded.

23 Claims, 6 Drawing Sheets

SUBBAND 1
SUBBAND 2
SUBBAND 3
SUBBAND 64

SAMPLE I

HIGH DEFINITION TELEVISION ARRANGEMENT WITH SIGNAL SELECTIONS ADAPTED TO THE AVAILABLE TRANSMISSION CAPACITY

BACKGROUND OF THE INVENTION

This invention relates to high definition television. More particularly, this invention relates to a method and apparatus for encoding video signals to fit within a given limited transmission capacity.

This application is related to a number of applications filed on even date herewith, titled: "A High Definition Television Arrangement Employing Motion Compensated Prediction Error Signals", "PAM Signal Modulation With Mappings to Improve Utilization of Available Transmission Capacity", A High Definition Television Arrangement Including Noise Immunity Means", and "A Television Signal Arrangement Where Selected Signals are Encoded Digitally".

Video signals typically originate from video cameras. The bandwidth of video signal is quite substantial and, consequently, practitioners in the art have tried to reduce the bandwidth of these signals without unduly degrading the images. Typically, to reduce bandwidth, the video signals are encoded, and redundancies in the encoded signals are extracted and deleted. Different techniques are used in the art. Some are better suited for still images, while others are better suited for moving images. One of the techniques for reducing the bandwidth of moving images is generally referred to as motion compensated predictive coding.

In conventional motion compensated predictive coding, each video frame is first partitioned into square blocks of picture elements (pels); such as blocks of 8 pels by 8 pels. Each block is coded, in turn, and the developed encoded sequence is transmitted over a communications channel to a decoder. The communications channel may be, or may include, a storage element. Following the partitioning step in the encoding process, a determination is made as to whether or not the pels of the block have changed significantly compared with the previous frame. If not, an indicator signal is sent which signifies to the decoder that it needs to merely repeat the pels of that block from the previous frame to obtain the pels for the current block. This step is known as "Conditional Replenishment". If the pels have changed since the previous frame, an attempt is made to determine the best estimate of motion that is occurring in the block. This is frequently done by a "Block Matching Motion Estimation" technique wherein the pels of the current block are successively compared with various small shifts of the corresponding block in the previous frame. The shift that gives the best match is deemed to be the "best estimate" of the displacement in the block's image between frames, and the amount of this shift, called the "Motion Vector", is selected and sent to the decoder.

The "best estimate" is, of course, the estimate that yields the smallest difference signal between the image in the current block and the image in the shifted block of the previous frame. This difference signal forms the error signal. When the error signal is sufficiently small, an indicator signal is sent to the decoder, which merely causes the pels of the shifted block from the previous frame to be repeated for the pels for the current shifted block. Such blocks are said to have been successfully "Motion Compensated". However, if there is a significant difference between the two blocks, the difference is encoded and sent to the decoder so that the pels of the current block may be more accurately recovered. Coding of this difference is typically performed by means of the "Discrete Cosine Transform" (DCT). It is a measure of energy.

The amount of coded information that is generated by the above procedure is variable. It can be appreciated, for example, that image changes that do not correspond to a uniform translation, or motion, of the image may require substantial encoding to describe the deviation of a block from its best translated replica. On the other hand, when the image does not change between successive frames, then there is a minimal amount of information that needs to be encoded. To accommodate these potentially wide variations in the amount of code that needs to be transmitted, typical encoders include a memory at the output, to serve as a buffer.

The buffer is not a panacea, however. For a given transmission rate, when an excessive volume of data is generated, there is always a danger that the FIFO would overflow. When it does, coding must stop until the transmission channel can empty the FIFO sufficiently to permit new data to be inserted.

All of the above teachings in the art deal with the coding and decoding aspects of reducing the bandwidth of the TV signal, but none deal explicitly with the formatting of the signal in preparation for transmission. When it comes to high definition television, both the bandwidth and the formatting problems must be solved and the difficulties are even greater than in connection with conventional TV signals because the desired signal compression is even greater, and because the requirement for a more authentic representation of the original image are more stringent.

SUMMARY OF THE INVENTION

A high definition television system that is characterized by low transmission bandwidth is achieved by removing much of the redundancies in the signal, efficiently encoding the remaining signals, and transmitting the encoded signal in a manner that is most compatible with the applicable standards. Because the transmission capacity is limited, it is essential to tailor the encoded and transmitted information to fit within the available space.

In accordance with one aspect of this invention, groups of signals to be sent are mapped to codebook vectors, and the identities of the codebook vectors are sent together with those signals of the groups of signals that correspond to the codebook vectors. To insure that the total number of signals that are sent does not exceed the available capacity, the signals are sorted by a selected importance parameter. Signals from the sorted list are assigned for transmission in descending order of importance until the capacity is exhausted. Signals that are not assigned for transmission are discarded.

In accordance with another aspect of this invention, the codebook vector that is selected to represent a group of signal is chosen by identifying the vector that provides the most benefit in the receiver, per signal sent to the receiver.

In accordance with still another aspect of the invention, the codebook vector that is selected to represent a group of signals is chosen by identifying a vector that through transmission of a minimum number of signals introduces an error in the receiver that is lower than a chosen threshold.

DETAILED DESCRIPTION

Figure 1:
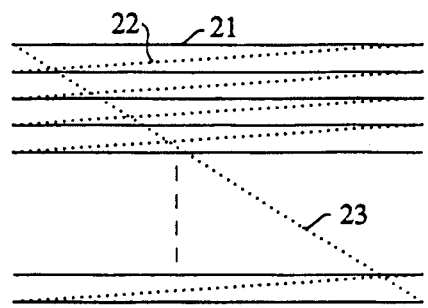
FIG. 1 depicts the conventional television scan arrangement.

FIG. 1 depicts a conventional TV raster. The picture is developed by scanning the image one line at a time. Each scan line (21) is followed by a horizontal retrace 22 and the last line of the frame is followed by a vertical retrace 23 which includes a vertical sync pulse embedded in the retrace interval. Conventional TV includes an "interlace" concept, but for the purposes of this description it is of no significance. It may be noted, however, that the aspect ratio of HDTV, which is expected to be 16 to 9, is different from that of conventional TV. This fact also has very little significance to this description.

Figure 2:
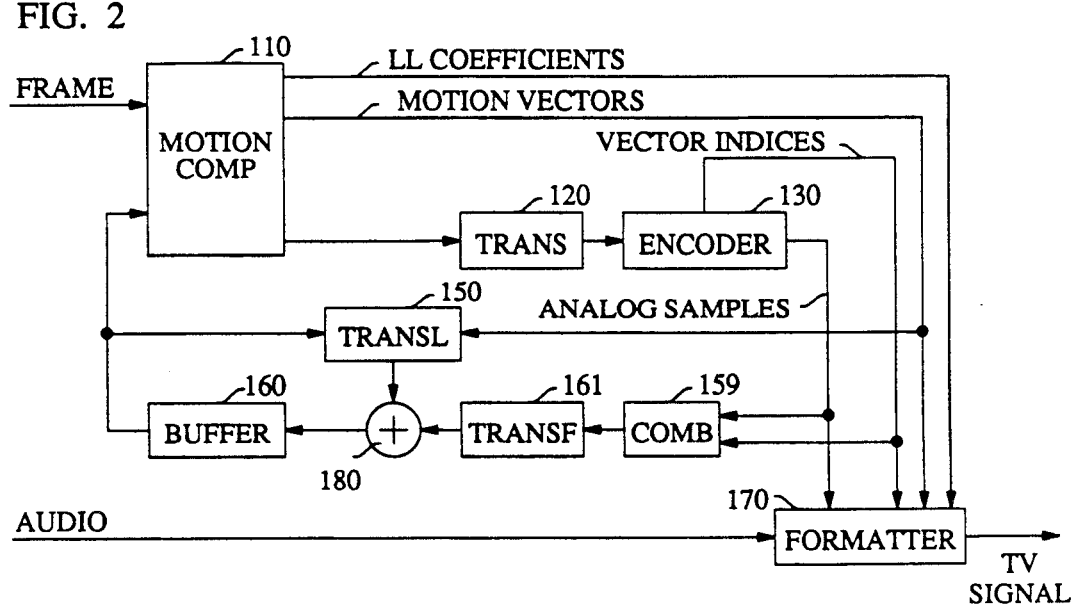
FIG. 2 presents a block diagram of the signal encoder portion of a video transmitter.

FIG. 2 depicts a general block diagram of a transmitter for high definition television. Block 110 is responsive to an incoming frame and to a frame within buffer 160. It develops low frequency coefficients (LL coefficients) and motion vectors which are applied to formatter 170 and translation circuit 150, and motion-compensated prediction error signals which are applied to transformer block 120. Block 120 performs a transformation on the applied signals (basically a time domain to frequency domain transformation) and applies the results to encoder block 130. Encoder 130 develops a greatly reduced set of signals, in the form of discrete amplitude error signals and vector index signals, which, in combination, represent the signals created in block 120, and forwards the signals streams to formatter 170 and decoder 159. The signals developed in encoder 130 are selected and arranged to fill the available transmission capacity with the information that is most important for an authentic recreation of the original image.

In the feedback portion of the transmitter decoder 159 is responsive to the error signals and the vector index signals of encoder 130. Its function is to recover the frequency coefficients that were selected and encoded in block 130. Its output is applied to transform circuit 161, and its function is to reconstitute, as best it can, the input signals of transformation block 120. The output of block 161 is added in element 180 to a motion compensated estimate of the frame and the sum is placed in buffer 160. The motion compensated estimate is developed in translation circuit 150 which is responsive to buffer 160 and to the motion vectors.

Formatter 170 combines the information supplied by blocks 130 and 110 with audio information associated with the frame, and creates a signal in a format that is suitable for whatever transmission medium is employed by the user. In accordance with one approach, the error signals developed by encoder 130 are organized to fit within, and are formatted to be in, the line scans interval of the frame. All of the other signals applied to formatter 170 are encoded into the retrace interval of the frame.

Figure 3:
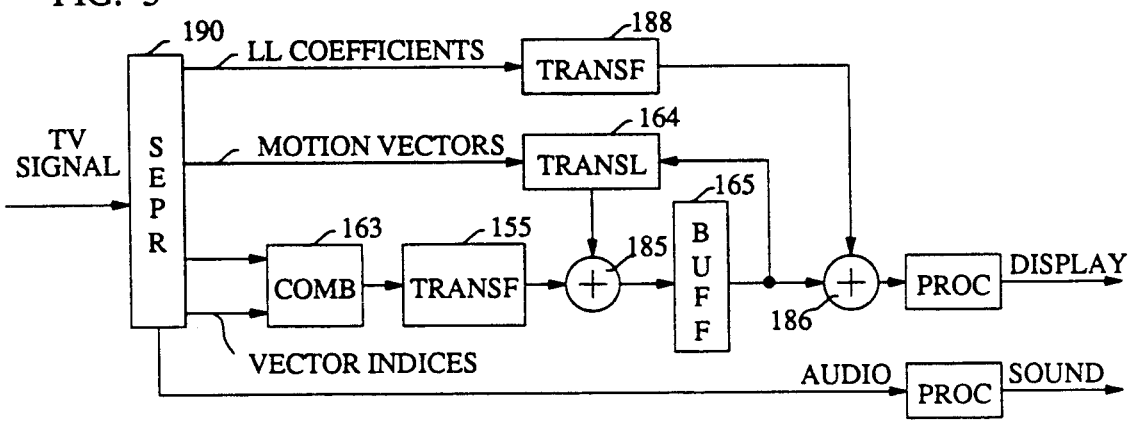
FIG. 3 presents a block diagram of a receiver comporting with the signals developed by the FIG. 2 transmitter.

The receiver that corresponds to the transmitter of FIG. 2 is shown in FIG. 3. It includes a separation block 190 which recovers the audio signals, the LL and motion vectors signals of block 110 and the output signals of encoder 130. The signals corresponding to the output signals of encoder 130 are applied to decoder block 163. Like decoder block 159, block 163 recovers the frequency coefficients selected and encoded in block 130. The output is applied to transform circuit 155 which reconstitutes, as best it can, the input signal of transformation of block 120. Concurrently, the motion vectors developed in block 110 are applied to translator circuit 164 which modifies the output of buffer 165 in accordance with those vectors. The result is applied to adder 185 which sums the output signals of blocks 155 and 164 and applies the results to buffer 165. Buffer 165 contains the $\overline{LL}$ video frame information of the receiver (which is the image, minus the portion represented by the LL coefficients). Concurrently with the processing in element 155 and 185, the LL coefficients of block 190 are applied to transform block 188 which develops the LL image of the receiver. The LL image is added to the $\overline{LL}$ image in element 186, to form the final receiver frame. That frame is processed and displayed, and the associated audio is processed and converted to sound.

Figure 4:
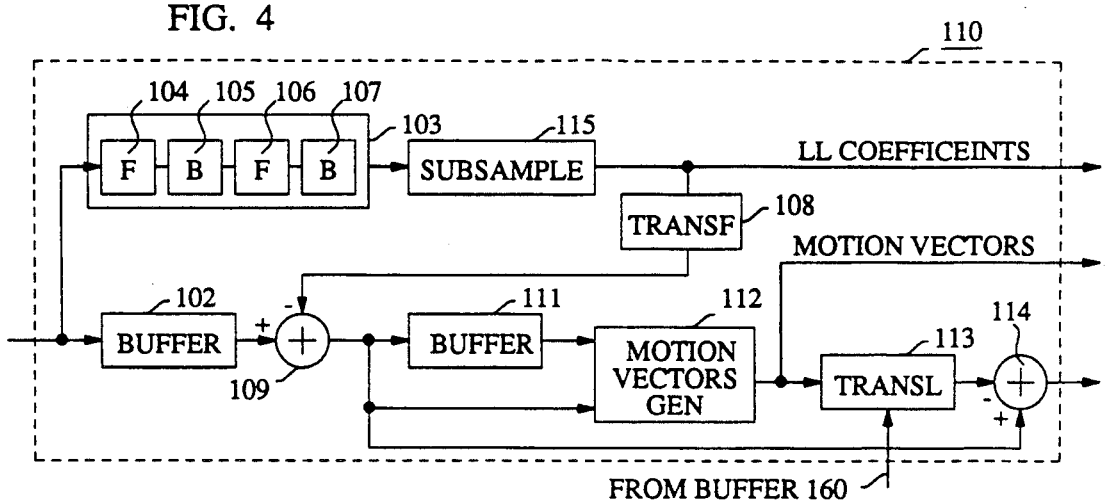
FIG. 4 is a detailed block diagram of the motion compensator circuit in the FIG. 2 transmitter.

The details of motion compensation block 110 are shown in FIG. 4. Therein, the incoming frame is connected to buffer 102 and to two-dimensional low pass filter 103 coupled to sub-sampler 115. Filter 103 contains a conventional low pass filter 104, a buffer 105 for rearranging the data, a conventional low pass filter 106 responsive to buffer 105, and a buffer 107 for a second rearranging of the data. Filter 103 thus develops two-dimensional low frequency coefficients (LL coefficients) which are subsampled in 115 and applied to formatter 170. The subsampled output of filter 103 is also applied to interpolator block 108 which develops an LL image corresponding to the LL coefficients. While the LL coefficients and the LL image are developed, the applied image frame is delayed in buffer 102. The delayed image and the LL image are applied to subtracter 109, which subtracts the LL image from the applied image to yield an image where the low spatial frequencies are missing (i.e., the $\overline{LL}$ image). The $\overline{LL}$ frame output of subtracter 109 is applied to frame buffer 111, to motion vectors generator block 112 and to adder 114. As the $\overline{LL}$ frame is stored in buffer 111, the previously stored $\overline{LL}$ frame is extracted from buffer 111 and applied to motion vectors generator block 112. Motion vectors generator 112 operates on non-overlapping blocks of the image. These blocks can be of any size, but the size that we employ in connection with the HDTV embodiment described therein is 36 by 32 pixels (36 pixels in a row, 32 rows). For each selected block, a selected neighborhood of the block is searched in the previous frame (found in buffer 111) for a block of pixels that most approximates the block in question. In this manner, a motion vector is obtained that points to an area of the image in buffer 111 that best approximates the block in question.

The search process, to a single pixel accuracy, is perfectly conventional. To improve performance, our motion vectors are computed to $\frac{1}{2}$ pixel accuracy. This is accomplished by first developing a motion vector to 1 pixel accuracy and then interpolating in the neighborhood pointed to by the motion vector between rows and between pixels in the rows of the previous block to determine whether a subpixel motion vector specification is called for.

Figure 5:
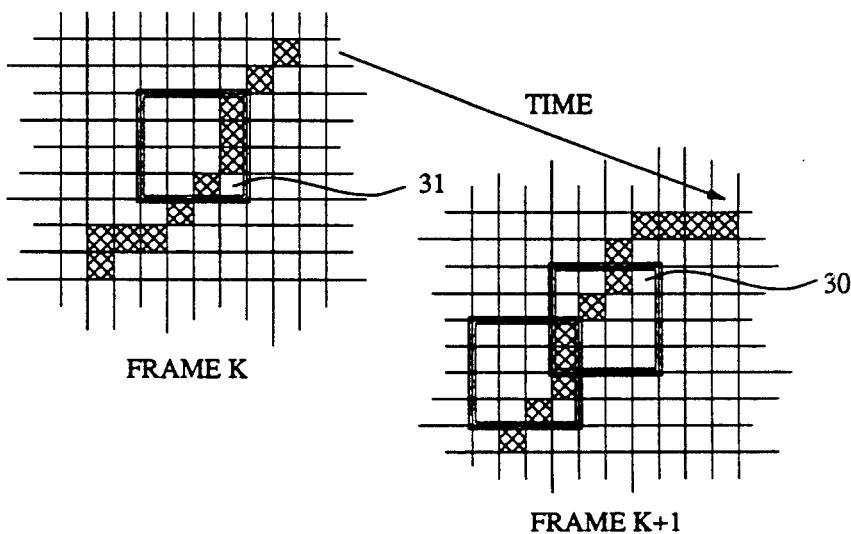
FIG. 5 illustrates the concept of motion compensation.

To illustrate, FIG. 5 depicts a region 31 in frame K and a block of pixels 30 in frame K+1. As can be seen from a review of the two, block 30 of frame K+1 may be described quite accurately by stating that it corresponds to the region in frame K that is shifted with respect to the position of block K by two pixels upwards and three pixels to the right.

The motion vectors of generator block 112 are applied in FIG. 4 to translator 113. The other input of translator 113 is the output signal of buffer 160. As mentioned above, the output of buffer 160 represents the previous $\overline{LL}$ frame as it is known to the receiver. The motion vectors are compared in translator 113 with the image of buffer 160 to form a predicted motion-compensated $\overline{LL}$ frame. Typically, this predicted frame does not faithfully represent the $\overline{LL}$ frame. Almost always there are errors in the predicted frame. To ascertain the position and intensity of those errors, the motion-compensated $\overline{LL}$ frame of translator 113 is applied to subtracter 114, wherein it is compared to the $\overline{LL}$ frame signal itself. The output of subtracter 114 is a frame of motion-compensated prediction error signals. Those signals are applied to transformer block 120.

Figure 6:
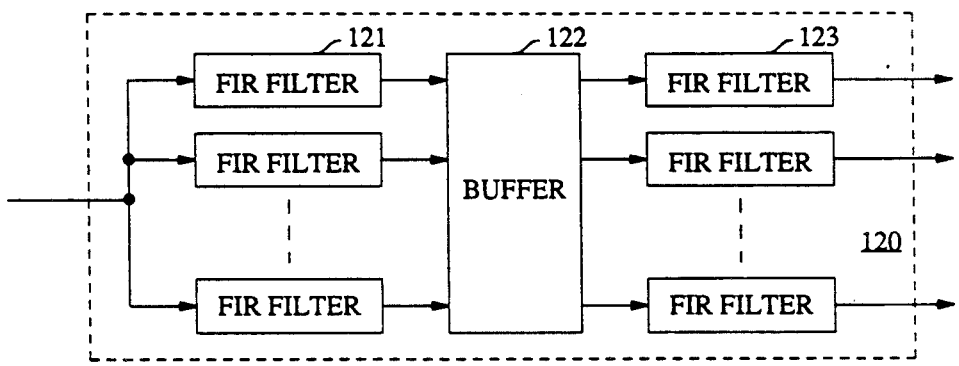
FIG. 6 develops one structure of the two-dimensional transformation circuit in the FIG. 2 arrangement.

Transformer block 120 maps the information to the frequency domain. Although there are many approaches for such a mapping, the approach chosen here involves 16 FIR filters, as depicted in FIG. 6. Specifically, the input of block 120 is applied to 8 "horizontal" filters 121. Each filter spans 64 pixels and develops a coefficient that represents the intensity of signals in a chosen frequency band. The filters are termed "horizontal" because the input pixels to a filter are taken from successive pixels on the same line scan of the frame, and because successive coefficients are obtained by sliding the filter horizontally. The horizontal shift is by 8 pixels. Each developed coefficient is associated with the pixel that is at the center of the neighborhood defined by the 64 pixels, and thus, each line scan of M pixels produces M/8 coefficients in each of the 8 FIR filters (assuming that something is done at the edges of the scan lines—such as creating pixels to satisfy for the filter needs). The frequency bands that are evaluated by the 8 filters are chosen, or controlled, by the coefficients that are incorporated within the FIR filters. The outputs of the "horizontal" filters are appropriately rearranged with the aid of buffer 122 and applied to 8 "vertical" filters 123, which may be identical to the "horizontal" filters and which process the signals in the identical fashion. The overall effect that is created is that of two-dimensional filtering. Description of block oriented two-dimensional filtering can be found, for example, in U.S. Pat. No. 4,829,465 issued May 9, 1989. Overlapping blocks can also be employed, to reduce block boundary artifacts.

Figure 7:
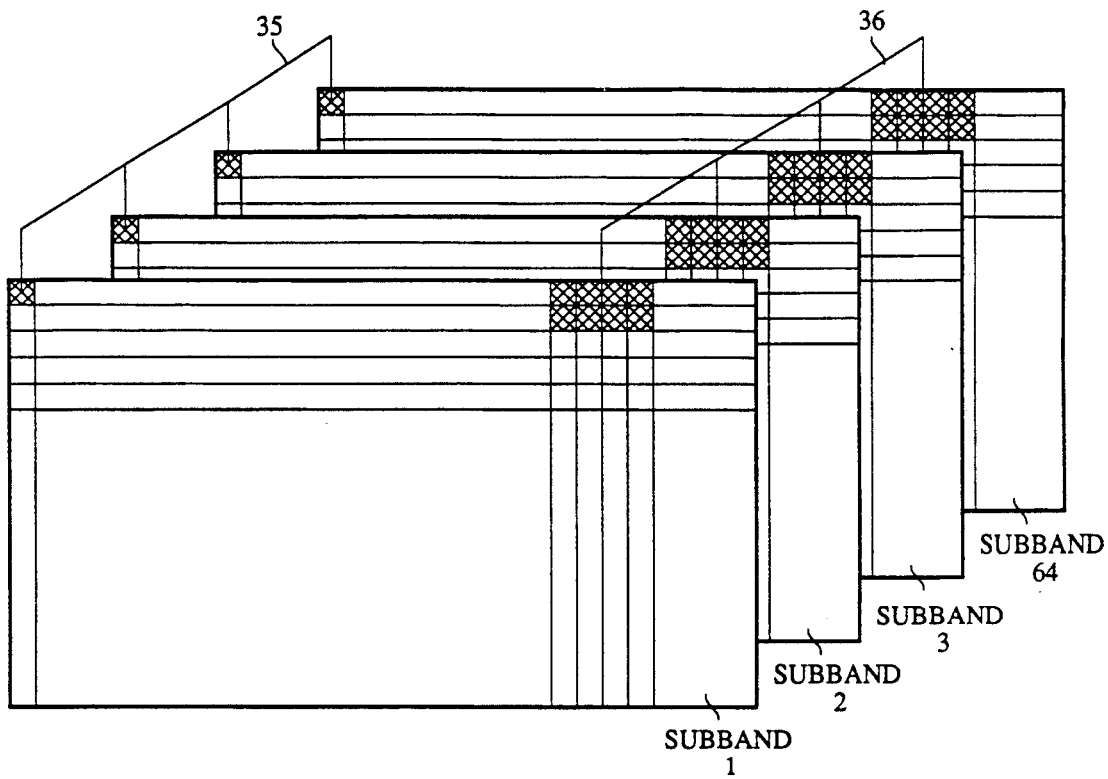
FIG. 7 presents a pictorial view of the subbands developed in the transmitter and the vectors that define the subband signals.

The output of transformer block 120 can be viewed as a collection of 64 subband frames, as depicted in FIG. 7. Each subband frame defines a subband with N/8 rows of coefficients and M/8 coefficients per row, where N and M are the numbers of rows and pixels per row in the image frame. As can also be observed in FIG. 7, corresponding coefficients in the subbands can be grouped to form vectors, such as vector 35. The elements of such vectors all stem from a common set of motion-compensated prediction error signals (of block 110). Alternatively, groups of coefficients in each subband (such as blocks comprising 2 rows of 4 coefficients) can be combined to form elements of a vector. This is illustrated by vector 36. In accordance with this approach, when vectors such as vector 36 are employed, the 64 subband frames may be represented by MN/512 vectors ($V_1$, $V_2$, ..., $V_{MN/512}$).

It is recognized that there are more efficient and less efficient ways of communicating the information contained in the 64 subband frames. The challenge, of course, is to select a more efficient approach rather than a less efficient one. It is also recognized that some granularity may be introduced, and some information in the frequency domain may be ignored without unduly damaging the image quality. Based on these recognitions, the function of encoder block 130 is to identify the most important image information contained in the 64 subband frames and to pack this information in the available transmission capacity. This may be accomplished in three steps. In the first step of such a three step approach, a selection is made to transmit some information and to simply ignore some information. In the second step, the information to be transmitted is approximated by choosing to transmit from a restricted lexicon of signals. The lexicon restriction results in lower demands on the digital transmission capacity. In the third step, the information is packed within the available transmission capacity. We call the effort of utilizing the available transmission capacity most efficiently the "packing task".

Having mentioned "transmission capacity", it makes sense at this point to describe what the available transmission capacity is.

Referring to FIG. 1, the line scans, the horizontal retrace and the vertical retrace periods are all directly related to the operation of the TV screen. They need not relate necessarily to the transmission of information to the TV receiver, as long as some means are provided to synchronize the screen to the received frame information. Hence, subject to the synchronization requirement, the time interval corresponding to the sum of those periods can be devoted entirely to the transmission of frame information.

In a terrestrial transmission environment, each TV channel is allocated a specific bandwidth. Typically, at the transmitter's end the TV signal is band limited and modulated (AM) onto a carrier. To minimize interference between TV channels, a "taboo" guard band separates adjacent TV channels, where no signals should be present. The "taboo" bands are needed because the band limiting of the baseband signals is not absolute and because there are always nonlinearities in the transmitter. Nonlinearities cause harmonic spillover. Even low levels of interference are often objectionable because they create "ghosts" in the interfered channel. The human eye is quite adept at detecting these patterns.

The need for reducing interference is greatest during the line scan. During the retrace periods, in contradistinction, much greater interference can be tolerated. At such intervals whatever interference is introduced needs to be limited only to the point of insuring that the interfering signal does not cause a loss of synchronization. In accordance with one aspect of this invention, interference is maintained at an acceptably low level by limiting the bandwidth of the information sent during the line scan intervals to the assigned channel's frequency band. During retrace, the bandwidth of the transmitted information may be allowed to expand into the "taboo" channel. More specifically, in accordance with the principles of this invention, during the line scan intervals we send motion-compensated prediction error coefficients that are selected to fit within the allocated signal bandwidth. All other information is sent during the retrace intervals.

Since the energy in the error signals represents the deviation of the predicted image from the true image, it is desirable to transmit as much of the energy represented by the motion-compensation prediction error coefficients as is possible. The largest amount of energy that the transmitter can impart to a receiver corresponds to the largest swings in the carrier's amplitude. Such "largest" carrier amplitude results in high positive and negative voltage level swings at the receiver. The product represented by the maximum RMS level of the receiver's voltage, times the interval during which that level is maintained, shown in FIG. 8 by area 99.

When signal power is not considered, the objective is to pack as many of the motion-compensated prediction error coefficients in the time interval of area 99. The motion-compensated prediction error coefficients, which are analog in value, can be represented by analog valued samples and the samples can be concatenated to form a step-like analog signal. The number of samples that can be packed within the line scan interval is limited by the permissible bandwidth of the modulating analog signal and by the ability of the receiver to resolve the signals in the time domain. The utilization of area 99, under such circumstances, may be as depicted by curve 98 in FIG. 8. More specifically, the utilization is depicted by the area below area 98, which represents the RMS values of the analog samples.

From the above it appears that a more efficient utilization of the transmission medium can be achieved by increasing the area under curve 98 and reducing the area above it. This can be accomplished by encoding the error signals appropriately. The digitized signal may then be like the one depicted by curve 97 in FIG. 8. Each level in the signal of curve 97 represents either one or more signal pulses. The process of combining a number of signals to form one signal is a "many to one" mapping.

The combining of digitized signals can, for example be quite straight forward. When a pair of like-signed signals has amplitude values lower than a selected value, such as the square root of the highest permissible amplitude, then the pair of signals may be combined to form a single digitized signal. The value of the resulting single signal may be dictated by a lookup table like the one depicted in FIG. 9. For example, when a first signal has the value 11 and a second signal has the value 3, the combined signal developed in accordance with the FIG. 9 table has the value 41. When converted to PAM format, a pulse of height 41 is sent to the receiver together with an indication that the pulse represents the combination of two signals. Upon receipt of such an indication and the value 41, the receiver accesses a similar look-up table and derives therefrom the two PAM pulses.

When a "one to many" mapping results in a signal with a specific analog level, as in the case above, great care must be taken in the encoding algorithm because transmission noise is always a factor. Specifically, the encoding algorithm must be such that a received signal that includes a small deviation from the transmitted level should not decode to signals that are markedly different from the signals that formed the transmitted level. It may be noted that the coding in the FIG. 9 table is so arranged. For example, a reception of level 10 when level 11 was transmitted does not cause an error in the decoded level of the second PAM pulse and changes the level of the first decoded PAM pulse by only one. The reception of level 16 when level 15 was transmitted causes no errors in the decoded level of the first PAM pulse and only an error of one level in the decoded level of the second PAM pulse.

The above describes a "many to one" mapping that aims to make the overall PAM signal out of the transmitter as large as possible. Actually, a similar consequence results from a "one to many" mapping where large digitized signals are encoded into two or more smaller signals. The encoding algorithm may be quite simple because the decoding process may simply by a combining of the constituent pulses. The "one to many" mapping improves utilization of area 99 (as does the "many to one" mapping) because it reduces the dynamic range of the signal and permits a more effective gain control mechanism.

Figure 9:
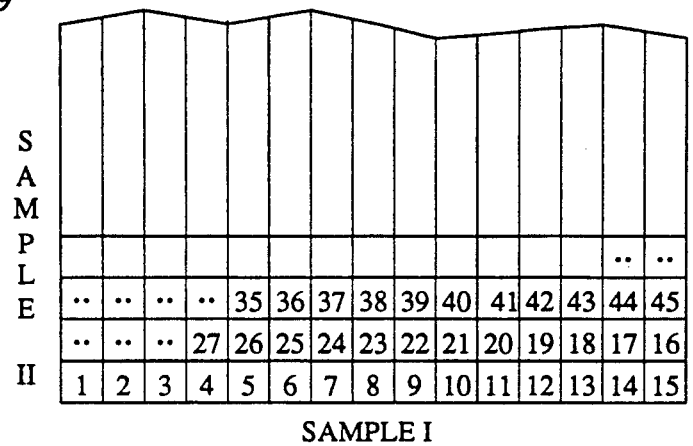
FIG. 9 presents a portion of an encoding look-up table that is useful in encoding two samples into one.

Whereas the FIG. 9 arrangement depicts an approach for combining two digitized signals, it should be clear that three (or more) digitized signals can be combined in a similar manner with a table (of corresponding dimensionality) that follows the concepts of FIG. 9.

When combining and splitting of the prediction error signals is not employed, the maximum number of PAM pulses that can be transmitted in region 99 is fixed (by the transmission bandwidth). When combining and splitting is employed, the maximum number of pulses that can be transmitted is no longer fixed. Rather, it depends on the signal characteristics. Still, experience with the transmission of various images gives some indication as to the percentage of digitized signals that can be combined, and that percentage provides an indication of the maximum number of signals that can be combined and transmitted to the receiver.

Figure 10:
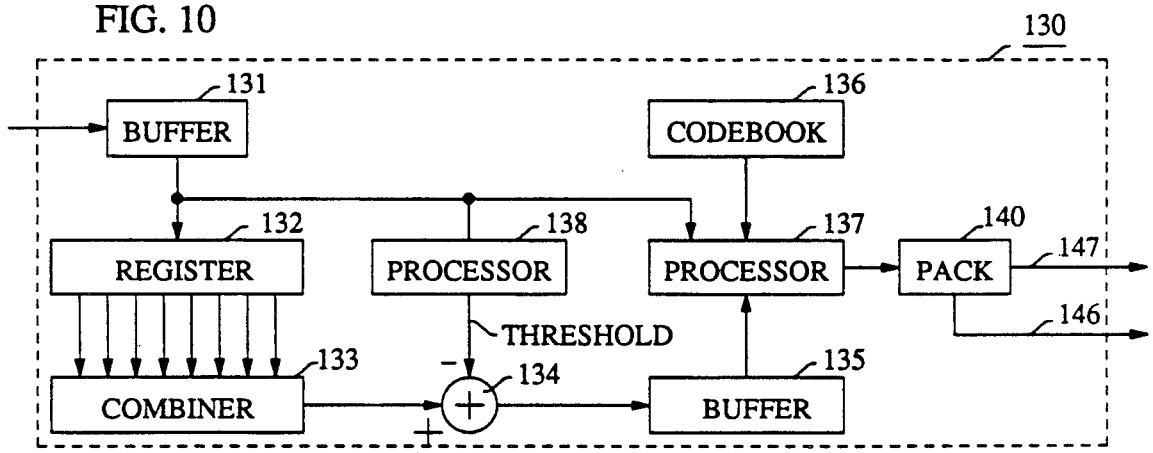
FIG. 10 presents the block diagram of one arrangement of the encoder within the FIG. 2 transmitter.

Returning to the detailed description of the FIG. 2 transmitter generally and to the packing task in particular, FIG. 10 presents a detailed block diagram of encoder 130 for the aforementioned three step approach. For the selection step, we chose to evaluate the subband frames of FIG. 7 through vectors 36. Specifically, it was chosen to combine the energies in the 8 coefficients of each element of a vector (the 8 coefficients in the 2 by 4 array of coefficients in a subband) and to compare the combined value to a threshold, thereby developing binary values that reflect the comparison results. Stepping through the subband frames in a non-overlapping fashion yields a set of vectors with 1 and 0 element values. In FIG. 10, buffer 131 stores the 64 subband coefficients, outputs groups of 8 coefficients and stores them in register 132. Combiner 133 develops a measure of the energy in the 8 coefficients and applies the results to subtracter 134. Subtracter 134 develops a 1 output when the combiner signal is greater than the threshold, and a 0 output otherwise. This binary output is stored in buffer 135. Buffer 135 stores 64 bit vectors. Each vector relates to a block of 8 coefficients in the 64 subbands. A 1 in buffer 135 of the subbands suggests that the coefficients that produced the 1 should be transmitted, and a 0 suggests that the coefficients that produced the 0 need not be transmitted.

Figure 8:
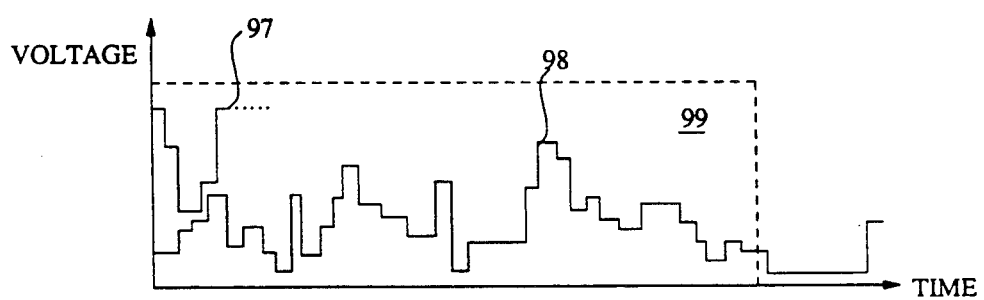
FIG. 8 depicts a PAM signal and its utilization of the available transmission capacity.

The threshold value applied to element 134 can be fixed or variable. It should not be set to a value that is so high that an insufficient number of coefficients are chosen to be transmitted. That would cause some transmission capacity to be unused. It should also not be so low that many more coefficients are selected for transmission than the available transmission capacity could handle. Such a selection would unnecessarily burden the processing equipment. FIG. 8 provides means for allowing the threshold to be set adaptively. Processor 138 has access to the coefficients in buffer 131. Knowing the transmission capacity, it sorts the coefficients (based on the energy of the coefficients) and counts from the sorted list the number of PAM pulses that would be transmitted. When the transmission capacity is exhausted, the energy level of the last-accepted coefficient becomes the applied threshold.

The assumption implied in deciding that savings will accrue when selected coefficients are not transmitted is that it takes more transmission capacity to transmit information which can be ignored, than to transmit the additional information necessary for identifying the information that is being transmitted. The assumption holds true only if the number K of such identifying information packets (that number being effectively controlled by the threshold level) and the capacity C required for identifying each such packet is such that the product KC (which is the capacity needed to identify what is transmitted) is less than the capacity saved by not transmitting the ignored information. This suggests that it is important to reduce C as much as possible.

The simplest way to identify the coefficients that are being transmitted and the coefficients that are not being transmitted is to transmit the 64 bit vector of 1s and 0s in buffer 135. Keeping the admonition to reduce C in mind, we discovered that image quality may be maintained while reducing the number of possible combinations from $2^{64}$ to $2^8$, or 256. A reduced set of possible combinations permits one to define each possible combination of 64 bits with only 8 bits. This mapping of 64 bits to 8 bits is achieved by creating a codebook table with 256 entries. Each entry maintains one of the 64 bit combinations (one codebook vector) and the codebook vector is identified by the address (index of the codebook vector) of the combination in the table. When such a codebook is employed, it becomes necessary to judiciously replace each of the combinations contained in buffer 135 with a codebook vector that best represents the replaced combination. This is the second step of encoder 130.

It is clear that, when considering a particular combination of 1s and 0s in buffer 135, selecting any codebook vector that specifies a different combination of 1s and 0s would result in the transmission of at least some coefficients with lower values than the threshold. That is, some high level coefficients that produced a 1 in buffer 135 may not be sent, and some low level coefficients that produced a 0 might be sent. Still, having decided to replace the full set of possible vectors with vectors from a limited set, it appears beneficial, at this level of optimization, to send the vector from the codebook that is (a) most like the vector it replaces and (b) transmits the most combined prediction error coefficients energy.

In FIG. 10, block 136 contains a codebook of 256 vectors of 64 bits each. Processor 137 is responsive to the codebook, to buffer 135, and to buffer 131. In accordance with one approach of this invention and the above-described beneficial choices, processor 137 identifies the information in buffer 131 that corresponds to a vector of 1s and 0s in buffer 135, determines the number of 1s in that buffer 135 vector, and tentatively selects from codebook 136, one at a time, those vectors with an equal number of 1s. It then evaluates the combined energy of all coefficients that would be transmitted if the tentatively selected vector were finally selected, and does finally select that tentatively selected vector that would transmit the set of coefficients with the largest combined energy. The selected codebook vector and the selected coefficients from buffer 131 are applied to packing block 140.

The selection of the vectors which are made a part of the codebook should attempt to minimize the errors that are introduced by virtue of the substitution of a codebook vector for the desired vector. A single codebook vector can be used, of course, but experience indicates that a better performance can be attained by using different vector sets for different types of images.

Using different codebooks increases the cost of the receiver somewhat, burdens the transmission channel slightly, and increases the cost and processing burden at the transmitter. Where these costs are acceptable, the transmitter includes a plurality of encoders 130, where each has its own set of codebook vectors. Blocks 130 work in parallel on the commonly applied signal and each develops a best set of prediction error signals to be sent. Working in some predetermined rate, such as the frame rate, block 140 evaluates the signals offered by the various blocks 130 and selects the set that is best. It then sends to formatter the set of prediction error signals and the ID of the selected encoder 130. The burden on the transmission channel is very small indeed, since that needs to be sent is an ID code, which may be 5 bits or so.

At the receiver, combiner 163 receives the prediction error signals and the codebook ID. It contain a number of codebooks, the codebook that is applied is selected by the ID.

In applications where more than a few bits of transmission capacity are available, encoder 130 of the transmitter may include means for actually creating the best codebook vector for each signal segment (such as a frame, or a plurality of frames) and transmit the actual codebook to the receiver. The receiver installs the codebook and then applied it to the prediction error signals that follow. Although the algorithms for doing this are known, the processing time required for developing a "best" codebook may be prohibitive, so an intermediate approach may be taken that is faster to develop and faster to communicate (fewer bits) to the receiver. That is, the transmitter may start with a set of codebooks and optimize, or simply improve, the best one of the plurality of codebooks. It would then send to the receiver only the ID of the best codebook, and the modifications needed to improve it. The receiver works in a corresponding manner. It either includes a single codebook, a plurality of codebooks that are selected based on a received codebook identifier, means for receiving codebook information, or a combination of the last two. That is, in an application where some transmission capacity is available, the transmitter sends information that identifies a particular codebook and some deviations from that codebook. The receiver obtains that information, selects the appropriate codebook, modifies it in accordance with the received information, and applies the modified codebook to the prediction error signals.

The function of block 140 is to sort the information by the degree of importance that the sorted information has for the development of a high quality reproduction of the video frame, and to transmit as much of the important information as is possible within the constraints of the channel capacity. This packing function is achieved in block 140 by creating a table that contains four columns: a codebook vector identifier column, a number of selected coefficients column, a block number identifier column, and an importance measure column (e.g. total energy in the subbands selected for transmission in accordance with the 1's in the vector). As an aside, the second column, which indicates a number of selected coefficients, is strictly a function of the codebook. For example, for a codebook of 16 codebook vectors, the vector identifier can be a 4-bit number in the range 0000 to 1111. Vector identifier 0000 may correspond, for example, to vector 0100110001110000. That means that whenever vector identifier 0000 is found in the first column of the table, the second column of the table contains the number 48 (which is the number of 1's in vector 0100110001110000 times 8—8 being the number of pixels in the subband group).

The packing process proceeds in block 140 by sorting on the "importance" column. As illustrated in the table below, the first entry belongs to codebook vector 1001, with 56 selected error coefficients. This entry is for block 23, which has an energy level of 731. The second entry belongs to codebook vector 1100, with 24 selected error coefficients. This entry is for block 511, which has an energy level of 623. The third entry belongs to codebook vector 0001, with 3 (different) selected subbands. This entry is for block 127, which has an energy level of 190. Subsequent entries (which are not shown) have lower energy levels.

| vector ID | # of coeff. | block ID | importance |
|---|---|---|---|
| 1001 | 56 | 23 | 731 |
| 1100 | 24 | 511 | 511 |
| 0001 | 24 | 127 | 190 |
| 0101 | 8 | 1023 | 102 |
| . | | | |
| . | | | |

In addition to the above sorting and selection from the top of the sorted list, block 140, performs the above described signal combining function signals when the magnitudes of the error signals so suggest (per FIG. 9). By selecting from the sorted table, keeping track of the number of selected coefficients (column 2), performing the "many to one" and "one to many" mappings and augmenting the selections information in accordance with these mappings, block 140 is able to keep track of channel capacity that is taken up by the entries selected from the sorted table. When the allotted capacity (i.e., number of PAM pulses) is exhausted, selections from the table are terminated.

Figure 11:
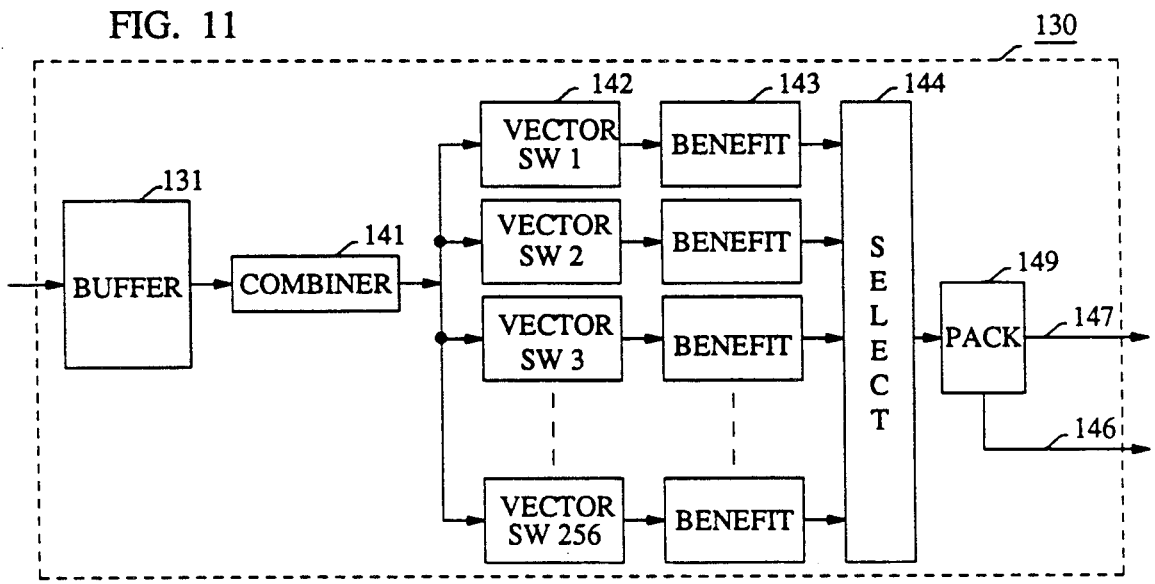
FIG. 11 presents the block diagram of another arrangement of the encoder within the FIG. 2 transmitter.

The above-described encoding, selecting, and packing approach of encoder 130 is merely illustrative, of course. FIG. 11 presents another approach.

In FIG. 11, the input to encoder 130 is applied (as in FIG. 10) to buffer 131. The groups of 8 pixels from each of the 64 subbands (vector 36) are accessed from buffer 131 and applied to block 141, which develops a measure of the energy in each of the elements of the 64-element vector. This information is applied to 256 codebook vector switching circuits 142. Each circuit 142 merely passes the energies of the elements that correspond to a 1 in the codebook vector. Thus, the output of a circuit 142 that pertains to codebook vector P provides a measure of the energy that would be sent if that codebook vector were used. On first blush, one might believe that sending the most energy is best, and that would suggest selecting a codebook vector with a large number of 1s. However, an unadulterated measure of the energy may be counter indicated. Since the total number of 1s in the selected codebook vectors is fixed, a better approach would be to maximize the benefit that each 1 in the selected vectors provides. Selecting the latter measure, each switch 142 in FIG. 11 is followed by a benefit measuring circuit 143. The benefit measure may be the average energy per 1 in the codebook vector, or some other measure.

To optimize the selection, the outputs of the 256 benefit measuring circuits are applied to selector block 144. It selects the codebook that offers the greatest benefit per 1 in the codebook; which is also the greatest benefit per transmitted set of 8 prediction error coefficients. The output of selector 144 is applied to packing block 149, which is very similar to packing block 140. To wit, block 149 sorts the chosen codebook vectors by their benefit measures selects from the top of the sorted list performs the "many to one" and "many to one" mappings as appropriate, and accumulates signals to be transmitted until the transmission capacity is exhausted.

Alternatively, a more encompassing optimization can be undertaken by considering the entire set of transmitted vectors. When a codebook vector codebook $C_i$ is sent to describe a particular vector $V_j$, a distortion $D_{ij}$ is introduced when $C_i$ does not correspond exactly to $V_j$. The goal, of course, is to send codes $C_i$ in place of vectors $V_j$, which minimize the distortion and yet stay within the total budget of the number of subband samples that may be transmitted. Distortion may be defined in a number of ways, and for illustrative purposes two definitions are presented:

$$\text{CASE I: Distortion} = \sum_{i=1}^{N} D_i$$

$$\text{CASE II: Distortion} = \max_{1 \leq i < N} \{D_i\}$$

Clearly, the most efficient use of the budgeted capacity is to employ a codebook vector C that contains the lowest number of 1s, because each 1 represents a call to transmit a 2 by 4 sample block of the subband corresponding to the position of the 1. The codebook may contain a number of vectors with the same minimum number of 1s. Picking one of those vectors and arbitrarily assigning the index 1 to it, that $C_1$ vector becomes the benchmark. The benefit of picking any other codebook vector $C_i$ for the purpose of representing vector $V_j$, $BENEFIT_{ij}$, is $D_{1j}-D_{ij}$. The cost of picking such a vector, $COST_j$, is $c_j-c_1$, where $c_j$ is the number of 1s in vector $C_j$. In connection with CASE I, the task, then, is as follows:

$$\text{maximize} \sum_{j=1}^{NM/512} BENEFIT_{ij}$$

$$\text{such that} \sum_{j=1}^{NM/512} COST_j \leq K,$$

where K is the number of samples that may be sent.

Any one of a number of nonlinear programming techniques may be used to solve this problem. The above-described approach of the FIG. 11 arrangement can also be extended to develop ratios of benefits per cost, sort the ratios, and select from the top of the list.

The CASE II measure is believed to be a better measure for HDTV, since in high quality coding, the few worst case errors stand out. Accounting for this preference to take care of worst case errors can be achieved by combining the FIG. 11 "per vector" approach with the more global approach described above. That is, a table can be constructed as shown below with sorted entries of distortion for each of the NM/512 vectors V. Selecting the best set of NM/512 vectors suggests a two step process: (1) selecting the row with the largest distortion at the beginning of sorted list, and (2) if capacity permits, discarding that distortion and returning to step 1. The capacity used is the number of 1s in the vectors corresponding to the vectors C that produce the left most distortions in the table.

| Block # | Sorted Entries of Distortion |
|---------|------------------------------|
| $V_1$ | $D_{1j1} > D_{1j2} > D_{1j3} \ldots > D_{1j256}$ |
| $V_2$ | $D_{2j2} > D_{2j2} > D_{2j3} \ldots > D_{2j256}$ |
| ... | |
| $V_{NM/512}$ | $D_{2jNM/512} > D_{NM/512j3} > D_{2jNM/512} \ldots > D_{NM/512j256}$ |

The most straight forward implementation for this process, from a conceptual viewpoint, is to have NM/512 registers, where each has 256 cells for storing one of the sorted rows in the above table. Each cell contains the ID of the vector C, the number of 1s in that vector, and the distortion associated with that vector for that row. The distortion outputs of the registers are applied to a selector circuit that identifies the largest applied distortion and, concurrently, the number of 1s outputs of the registers are applied to a summing circuit. If the summing circuit indicates that capacity is available, a clock pulse is applied to that register to shift that cell out of the register. The process is repeated until the summing circuit indicates that there is no more capacity. The C vector IDs in the left most cells represent the C codebook vectors to be transmitted.

When NM/512 is large, it is not to easy to construct those registers, so the process can be reversed by creating 256 registers and storing in each register one of the columns in the above table. In this realization, the rows of the table need not be sorted (as depicted in the table). This arrangement is depicted in FIG. 14, where each of the registers 193 contain NM/512 cells of distortion values and the corresponding number of 1s and codebook vector C identifiers.

Figure 14:
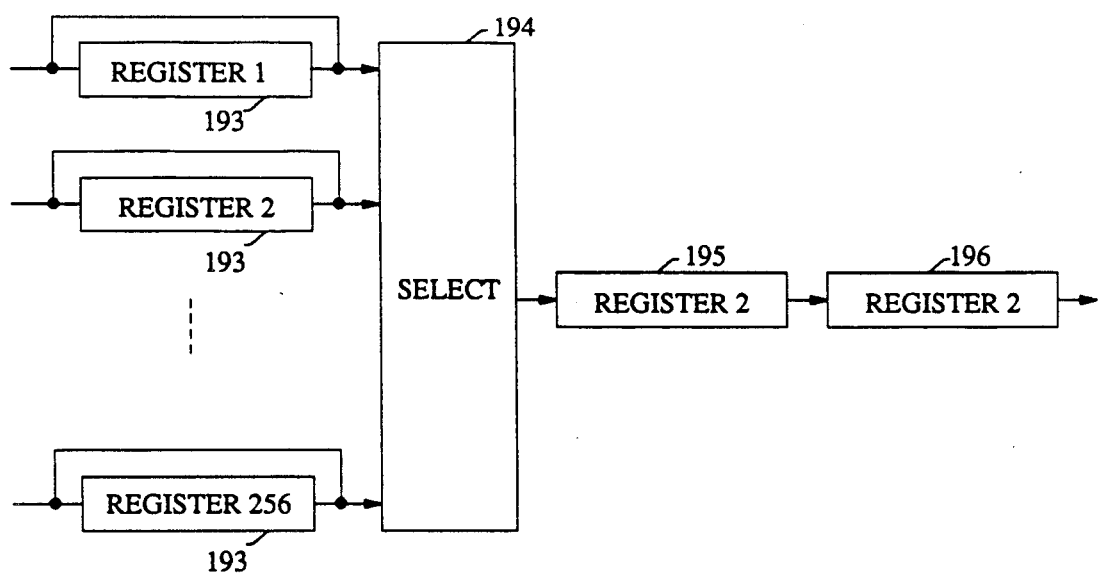
FIG. 14 presents the block diagram of a still another arrangement of the encoder within the FIG. 2 transmitter.

The process of selection in the FIG. 14 arrangement proceeds by applying the data of each register 193 to threshold block 194 as the data is fed back and reinserted into the register. The function of block 194 is to receive sets of 256 cells and to select from each set the cell with the minimum number of 1s whose distortion is lower than an applied threshold value. The selected cells are applied to register 195. The contents of register 195 form the current candidate.

While the selections are made, number of 1s of the selected cells are accumulated within 194 over the NM/512 cells in each of registers 193, and at the end of the cycle a determination is made whether the accumulated number of 1s exceeds the transmission capacity. Starting with a threshold level that is reasonably expected to be higher than necessary, at least on the first pass, the number of 1s will not exceed the capacity. While the capacity is not exceeded, the possibility exists that the threshold may be lowered. As the cycle is repeated with a lowered threshold, the contents of register 195 are shifted into register 196. When the threshold can no loger be reduced, the contents of register 196 contains the best set of vectors C. The selection of thresholds can follow conventional search techniques of cutting the range of uncertainty in half with each iteration. This would lead to a number of iterations that is on the order of log n, where n is the range of the distortions.

The above-described concept of packing more than one PAM pulse in a single slot improves performance via a better utilization of the available capacity as it is reflected by area 99 of FIG. 8. There is another aspect of area 99 that may be addressed, and that is noise immunity. Since noise that is introduced by the transmission medium (between the transmitter and the receiver) is independent of the level of the transmitted signal, it is clearly advisable to transmit as large a signal as possible. This can be achieved in the system of our invention by introducing a controllable gain feature (CGF) into the transmitter and receiver.

As suggested above, the "one to many" signal mappings process interacts well with the CGF process because large signals are broken up into intermediate signals, and that reduces the overall "spikiness" of the signal. The lack of very large signals permits a larger CGF signal to be applied to element 154, and that results in a greater portion of area 99 to be encompassed by the signal energy.

Because of the noise that inevitably is introduced in the course of transmitting information to the receiver, one has to expect that, in spite of the CGF action, the information within buffer 165 will eventually differ from the information in buffer 160. This problem is overcome by the well known technique of inserting in the transmitted error signal a fraction of the true image, and by discarding in the receiver a corresponding fraction of the image stored in buffer 165. This is known as "signal leak".

Figure 12:
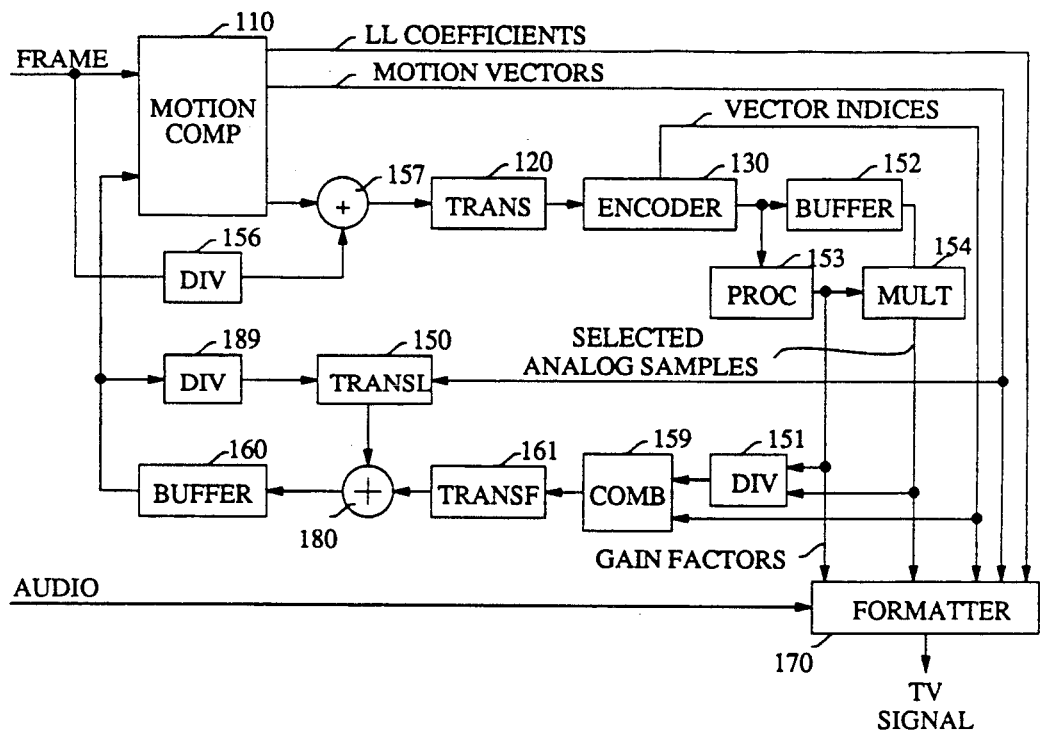
FIG. 12 is a block diagram of a transmitter which includes leak and a controllable gain feature.
Figure 13:
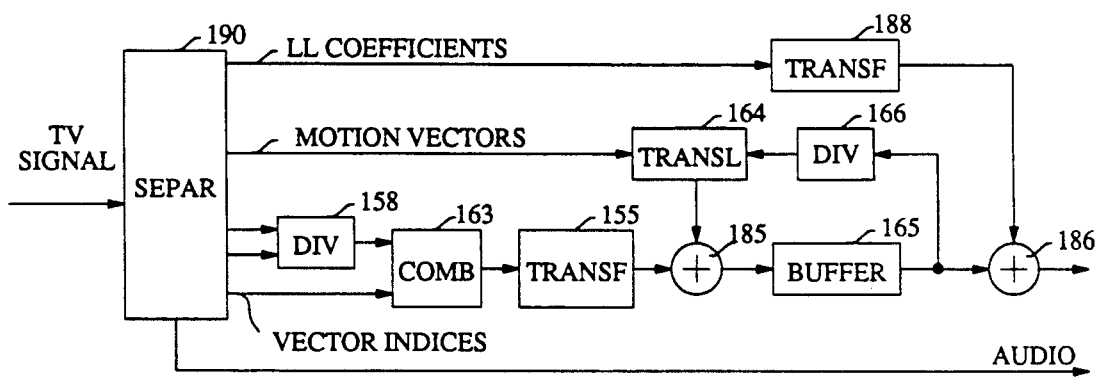
FIG. 13 is a block diagram of a receiver that comports with a transmitter of FIG. 12.

FIGS. 12 and 13 presents block diagrams of a transmitter and a receiver that include signal leak and CGF. The CGF capability is achieved by applying the PAM pulses delivered by block 140 (within block 130) to a buffer 152, which basically is a delay line. Processor 153, which is also responsive to the output of block 140 determines, at fixed intervals, the largest PAM pulse within the delay line buffer. Based on that information, a multiplicative factor is selected and applied to multiplication element 154, which receives its second input from buffer 152. The result is sent to formatter 170. The multiplicative factor, which is the CGF control signal, is also sent to formatter 170, for transmission to the receiver. The CGF action is accounted for in divider 151 which is responsive to the multiplication factors of processor 153 and to the output of element 154. The result is sent to decoder 159 which, with the vector information of encoder 130 recreates the frequency components of transform circuit 120 (as best it can). Those frequency components are transformed in block 161, to reverse the transformation effected in block 120, and the results are applied to adder 180. Concurrently, the motion vectors of block 110 are applied to translator 150. With the aid of these vectors, translator 150 modifies the information of frame buffer 160, and applies the results to adder 180. The sum signals developed in adder 180 are stored in buffer 160.

Actually, translator 150 is not connected to buffer 160 directly. Interposed between the two is a divider 189. The function of divider 189 is to account for the signal leak of block 156. Block 156 is responsive to the frame information applied to block 110. It transmits to its output a fraction of the signal applied to its input. That fraction is added by adder 157 to the motion compensated signal that is delivered by block 110 to block 120. Adder 157 is interposed between blocks 110 and 120. The fraction that we use in block 156 is 1/32. Divider 189, which accounts for the signal leak, also transmits to its output a fraction of its input. When the fraction in block 156 is 1/32, the fraction in block 189 is 31/32.

The receiver of FIG. 13 comports with the transmitter of FIG. 12. Separator 190 includes means for culling out the LL coefficients, the motion vectors developed in block 110 of the transmitter, the prediction error vectors of codebook 136 (which may include the mappings information), and the CGF multiplication factors. The CGF multiplication factors are applied to a divider circuit 158 which complements the actions of circuit 154 in FIG. 12. The output of divider 158 is applied to decoder circuit 163 and the output of circuit 163 is applied to transform circuit 155. The output of circuit is applied to adder 185 which feeds buffer 165. The output of buffer 165 is applied to divider block 166, and it supplies signals to translator circuit 164. Translator 164 is also responsive to the motion vector of block 190 and its output forms the second input of adder 185. The functions of blocks 158, 163, 155, 185, 165, 166, and 164 are identical to the functions of blocks 151, 159, 161, 180, 160, 189 and 150, respectively. As in the receiver of FIG. 3, output of buffer 165, which is the received $\overline{LL}$ frame, is applied to adder 186 where it is added to the LL frame developed in transform circuit 188. It may be noted in passing that divider circuit 158 affects only the amplitude of the prediction error signals. Skilled artisans would surely realize that divider 158 could follow combiner 163, rather than precede it, if so desired.

Although the above-described approach sends the motion-compensated prediction error signals in PAM format, the principles of this invention are applicable with equal efficacy to other modes of transmissions. Specifically, experimental results suggest that extremely good results can be obtained by sending only 200,000 error signals. Clearly, these error signals can be coded digitally and transmitted in that fashion over whatever transmission medium can handle the resulting bandwidth. Sending this information digitally over cable, for example, would obviate the need for the entire RF section of the transmitter (which is not shown in FIG. 1 anyway) and for the RF receiver section. Also, organization of the signals which puts the prediction error signals in the line scans period and the vector information in the retrace period need not be adhered to.

The above description presents the principles of this invention in the course of describing a transmitter and receiver arrangement that is suitable for HDTV. The details of construction of the illustrative embodiments that were presented are not delved into for the sake of brevity. All of the blocks that make up the designs presented in the figures can be created with conventional designs without undue experimentation. Indeed, many of the blocks in the transmitter and the receiver perform identical functions and can be constructed in an identical manner with conventional components.

It should be noted that other embodiments can be created that are encompassed within the spirit and scope of this invention. For example, it has been concluded through experimentation that a better performance is obtained (subjectively) by transforming the error signal developed in block 110 (in block 120) and by discarding some of the resulting frequency coefficients (in block 130). Actually, even in the time domain the error signal is generally small. When the available bandwidth is large and/or when the encoding process is efficient enough, it is possible to consider encoding the error signals themselves. The really small errors would be ignored, the large errors would be encoded, and some averaging can even be included. For example, the pixel that is ignored (because it error level is too low) but which is next to a pixel that is selected and encoded can be assumed to have a value just under the threshold level. Eliminating the need to transform into the frequency domain and back to the time domain clearly has a positive effect on the cost of the transmitter and the receiver.

What is claimed is:

1. A method for developing a video signal for a frame interval of a video camera observing an image, comprising the steps of:
responsive to a signal developed by said video camera, developing a plurality of video samples of a frame for transmitting during said frame interval,
when said step of developing produces a plurality of video samples in excess of the number of samples that can be transmitted in said frame interval, selecting from said plurality of video samples only a subset of said samples to be transmitted that, when transmitted, occupies essentially a predefined fraction of said frame interval wherein the selection is based on the relative value of the selected samples to the image quality, and
conditioning said subset of samples for transmission.

2. The method of claim 1 wherein said selection selects samples in a manner that effects primarily the spatial resolution of an image developed from said subset of samples.

3. The method of claim 1 wherein said step of selecting selects said video samples of a frame in order of a preselected attribute of said samples that is important to a faithful reproduction of the image which said video samples represent.

4. A method for developing a video signal for a frame interval of a video camera observing an image, comprising the steps of:
  responsive to a signal developed by said video camera, developing a plurality of video samples of a frame for transmitting during said frame interval,
  when said step of developing produces a plurality of video samples in excess of the number of samples that can be transmitted in said frame interval, selecting from said plurality of video samples only a subset of said samples to be transmitted that, when transmitted, occupies essentially a predefined fraction of said frame interval, and
  conditioning said subset of samples for transmission;
  wherein said step of selecting selects said video samples of a frame in descending order of energy.

5. The method of claim 4 wherein said step of conditioning includes application of a controllable gain.

6. The method of claim 4 wherein said step of conditioning includes a step of dividing said subset of samples into a plurality of clusters, developing a multiplicative factor for each of said clusters, applying said multiplicative factor to said cluster, and conditioning for transmission the developed multiplicative factors.

7. A method for developing a video signal for a frame interval of a video camera observing an image, comprising the steps of:
  developing a plurality of video samples of a frame;
  grouping said video samples in groups of K samples each, K being an integer constant, with each group forming a K component signal vector;
  from a codebook of M codebook vectors of K binary components each, M being an integer constant, associating a codebook vector with each of said groups;
  conditionally assigning for transmission, as a packet of samples, those of said samples in each signal vector that correspond to a 1 in the codebook vector associated with said each signal vector, to form thereby a set of packets of samples;
  when said set of packets of samples contains a number of video samples in excess of the number of samples that can be transmitted in said frame interval, selecting a subset of said packets of samples to be transmitted that, when transmitted, occupies essentially a predefined fraction of said frame interval, and
  conditioning said subset of packets of samples for transmission.

8. The method of claim 7 wherein, for each group of K samples, said step of associating identifies samples is the group whose amplitudes exceed a predetermined threshold and selects a codebook vector for associating whose is most closely coincide with the identified samples.

9. The method of claim 7 wherein, for each group of K samples, said step of associating selects a codebook vector that corresponds to the most average energy per transmitted sample compared to average energy per transmitted sample for other codebook vectors of said codebook.

10. The method of claim 7 wherein said step of associating select codebook vectors that result in transmitting packets of samples that result in a minimum overall distortion for a given number of transmitted samples.

11. The method of claim 7 wherein said step of associating select codebook vectors that result in transmitting packets of samples that result in a minimum average distortion for a given number of transmitted samples.

12. The method of claim 7 wherein said step of associating select codebook vectors that result in transmitting packets of samples that minimizes maximum distortion for a given number of transmitted samples.

13. The method of claim 7 wherein said step of selecting selects said packets of samples of a frame in descending order of energy.

14. The method of claim 7 further comprising a step of developing said set of M vectors to be included in said codebook.

15. The method of claim 7 further comprising a step of developing said set of M vectors to be included in said codebook repeatedly and sending conditioning information about the developed set of M vectors for transmission.

16. The method of claim 7 further comprising a step of developing said set of M vectors to be included in said codebook every fixed number of frames and sending conditioning information about the developed set of M vectors for transmission.

17. The method of claim 7 further comprising a step of developing said set of M vectors to be included in said codebook every fixed number of frames, with the aid of a plurality of candidate codebook vector sets, and sending conditioning information about the developed set of M vectors for transmission.

18. A method for developing a video signal for a frame interval of a video camera observing an image, comprising the steps of:
  developing a plurality of video samples of a frame;
  grouping said video samples in groups of K samples each, K being an integer constant, with each group forming a K component signal vector;
  for each of N codebooks of M codebook vectors having K binary components each, developing a set of potential prediction error signals.
  selecting one of said potential prediction error signals; and
  conditioning for transmission the selected prediction error signals and an identifier of the codebook that developed the selected set of potential prediction error signals.

19. A receiver for displaying a video frame in response to a signal having a retrace interval, a vertical sync pulse associated with said retrace interval, and a line scans interval timed with respect to said sync pulse, comprising:
  first means for receiving prediction error signals during said line scans interval;
  second means for receiving motion vector signals and codebook vector information during said retrace interval;
  third means responsive to said prediction error signals and to said codebook vector information for developing spatial information signals from said prediction error signals;
  fourth means responsive to said spatial information signals and to said motion vector signals for combining said motion vectors with said spatial information signals; and
  fifth means responsive to output signals of said fourth means for developing said video frame.

20. The receiver of claim 19 wherein said thrid means includes a codebook of vectors for interpreting said codebook vector information.

21. The receiver of claim 19 wherein said third means includes a plurality of codebooks of vectors, and means for receiving control signals that select one of said plurality of codebooks for interpreting said codebook vector information.

22. The receiver of claim 19 wherein said third means includes means for receiving codebook vector information and for applying received codebook vector information to interpret said codebook vector information.

23. The receiver of claim 19 wherein said third means includes means for receiving codebook vector information and for modifying a selected one of a plurality of codebooks of vectors to develop a modified codebook of vectors for interpreting said codebook vector infomation.

* * * * *